(12) United States Patent
Hori et al.

(10) Patent No.: US 7,401,297 B2
(45) Date of Patent: Jul. 15, 2008

(54) METHOD OF AND DEVICE FOR CONTROLLING DISPLAY OF WINDOW, AND COMPUTER PRODUCT

(75) Inventors: Tetsuya Hori, Inagi (JP); Yoshifumi Sanuki, Inagi (JP); Masatoshi Yamazaki, Inagi (JP); Kazumi Maruyama, Inagi (JP); Yoshiharu Koizumi, Inagi (JP); Tomoyuki Suzuki, Inagi (JP)

(73) Assignee: Fujitsu Limited, Kawasaki (JP)

( * ) Notice: Subject to any disclaimer, the term of this patent is extended or adjusted under 35 U.S.C. 154(b) by 622 days.

(21) Appl. No.: 10/351,403

(22) Filed: Jan. 27, 2003

(65) Prior Publication Data
US 2003/0142135 A1 Jul. 31, 2003

(30) Foreign Application Priority Data
Jan. 30, 2002 (JP) ............................. 2002-022532

(51) Int. Cl.
*G06F 3/048* (2006.01)
(52) U.S. Cl. ..................................... 715/781; 715/808
(58) Field of Classification Search ................. 715/781, 715/790, 854, 808
See application file for complete search history.

(56) References Cited

U.S. PATENT DOCUMENTS

| | | | | | |
|---|---|---|---|---|---|
| 5,371,847 | A | * | 12/1994 | Hargrove | 715/788 |
| 5,533,182 | A | * | 7/1996 | Bates et al. | 715/727 |
| 5,544,301 | A | * | 8/1996 | Orton et al. | 715/798 |
| 5,577,187 | A | * | 11/1996 | Mariani | 715/792 |
| 5,821,930 | A | * | 10/1998 | Hansen | 715/702 |
| 5,874,962 | A | * | 2/1999 | de Judicibus et al. | 715/789 |
| 5,880,733 | A | * | 3/1999 | Horvitz et al. | 715/850 |
| 5,923,307 | A | * | 7/1999 | Hogle, IV | 345/4 |
| 6,018,340 | A | * | 1/2000 | Butler et al. | 715/764 |
| 6,075,531 | A | * | 6/2000 | DeStefano | 715/788 |
| 6,229,537 | B1 | * | 5/2001 | Sobeski et al. | 715/803 |
| 6,573,913 | B1 | * | 6/2003 | Butler et al. | 715/761 |
| 6,801,230 | B2 | * | 10/2004 | Driskell | 715/854 |
| 6,816,176 | B2 | * | 11/2004 | Laffey et al. | 715/860 |
| 7,231,609 | B2 | * | 6/2007 | Baudisch | 715/769 |
| 2005/0071774 | A1 | * | 3/2005 | Lipsky et al. | 715/806 |

FOREIGN PATENT DOCUMENTS

| | | |
|---|---|---|
| JP | 06-059850 | 3/1994 |
| JP | 09-222980 | 8/1997 |
| JP | 09-325693 | 12/1997 |
| JP | 10-161621 | 6/1998 |
| JP | 2000-122777 | 4/2000 |

OTHER PUBLICATIONS

Japanese Office Action mailed Oct. 24, 2006 from corresponding Japanese Application No. 2002-0022532.
Japanese Office Action Mailed on Feb. 27, 2007 from corresponding Japanese Application No. 2002-022532.

* cited by examiner

*Primary Examiner*—Weilun Lo
*Assistant Examiner*—David Phantana-angkool
(74) *Attorney, Agent, or Firm*—Staas & Halsey LLP

(57) ABSTRACT

A window display control device comprises of a computer unit and a display unit. The computer unit has a display position determining section that determines a display position of a window on a screen based on data related to center point of vision of the user stored beforehand in a center point definition table. Finally, the display unit displays the window on the determined position.

12 Claims, 14 Drawing Sheets

AN EXAMPLE OF DISPLAY ON THE PROJECTOR SCREEN

AN EXAMPLE OF DISPLAY ON THE DISPLAY SCREEN

WINDOW POSITIONING IN THE CONVENTIONAL ART

WINDOW POSITIONING IN THE FIRST EMBODIMENT

FIG.3A

CENTER POINT OF USER'S VISION

| ax1 | ay1    ax2 |
|-----|------------|
|     | A          |
|     | ay2        |

FIG.3B

CENTER POINT OF THE DISPLAY WINDOW

| bx1 | by1   bx2 |
|-----|-----------|
|     | B         |
|     | by2       |

FIG.4

CENTER POINT C (x, y) DEFINITION TABLE
CRT: X=50%, Y=65%
LIQUID CRYSTAL DISPLAY UNIT: X=50%, Y=70%
PROJECTOR: X=50%, Y=35%
DISPLAY UNIT 1: X=50%, Y=40%
DISPLAY UNIT 2: X=50%, Y=45%
　　:

WINDOW MANAGEMENT TABLE
WINDOW: BX=200, BY=100, WINDOW ORIGIN IS NOT DEFINED

WINDOW MANAGEMENT TABLE
WINDOW: BX=200, BY=100, WINDOW ORIGIN IS (220, 266)

AN EXAMPLE OF DISPLAY ON THE
PROJECTOR SCREEN

AN EXAMPLE OF DISPLAY ON THE
DISPLAY SCREEN

FIG.12
SCREEN MANAGEMENT TABLE
SIZE (AX, AY) = (640, 480), BARYCENTER (640/2, 480/2) = (320, 240)
FIG.13A
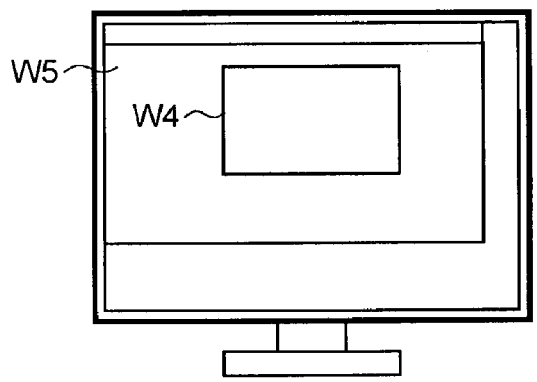
DISPLAY OF THE SCREEN ACCORDING
TO THE FIRST EMBODIMENT
FIG.13B
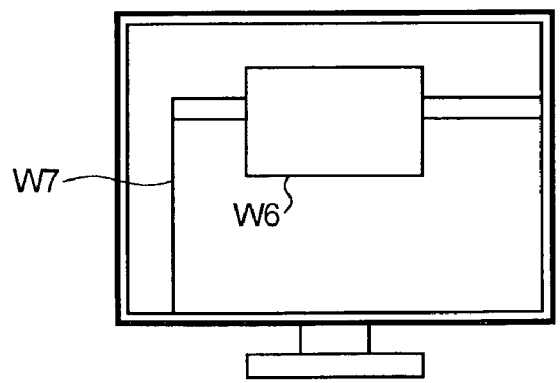
DISPLAY OF THE SCREEN ACCORDING
TO THE SECOND EMBODIMENT

FIG.15A

WINDOW MANAGEMENT TABLE
  RELATED WINDOW: DX=600, DY=400, ORIGIN POINT (DX0, DY0) = (0, 0)
  DISPLAY WINDOW: BX=200, BY=100, ORIGIN POINT (BX0, BY0) = (200, 210)

FIG.15B

SCREEN MANAGEMENT TABLE
  SIZE(AX, AY)=(640, 480), BARYCENTER(640/2, 480/2)=(320, 240)

FIG.15C

WINDOW MANAGEMENT TABLE
  RELATED WINDOW: DX=600, DY=400, ORIGIN POINT (DX0, DY0) = (40, 0)
  DISPLAY WINDOW: BX=200, BY=100, ORIGIN POINT (BX0, BY0) = (200, 210)

METHOD OF AND DEVICE FOR CONTROLLING DISPLAY OF WINDOW, AND COMPUTER PRODUCT

BACKGROUND OF THE INVENTION

1) Field of the Invention

The present invention relates to a technology for controlling a display position of a window on a screen.

2) Description of the Related Art

Recently, windows have been widely used as an interface to computers. Some of the main features of windows are that it is possible to freely change the position and size of windows and simultaneously view related information in multiple windows.

Therefore, there is a need of a technology that can improve the operatability of windows. Particularly, there is a need to assuage the weariness of the user's eyes and improve efficiency during usage of windows.

Conventionally, a new window is always displayed at the center of the display unit, especially when the position is not specified by any computer application.

However, the conventional art has a disadvantage that the user has to frequently shift eyes whenever a new window is displayed at the center of the display screen.

Consider, for example, a projector of a type in which the screen is suspended from the roof. In case of such a projector, the user will have a tendency to focus on relatively the lower portion of the screen. Therefore, if the window is displayed at the center of the screen, then the user has to move his/her vision largely from the lower portion of the screen to the center of the screen to see the contents of the window. Consider, as another example, a display unit of a desktop computer. In case of such a display unit, the user will have a tendency to focus on relatively the upper portion of the screen. Therefore, if the window is displayed at the center of the screen, then the user has to move her/his vision largely from the upper portion of the careen to the center of the screen to see the contents of the window.

Thus, in the conventional method of displaying windows, there is a problem that user has to move his/her vision greatly which causes weariness to the eyes of users. Therefore, a means to assuage weariness of eyes is highly desirable for computer users who stare into computers for long hours.

SUMMARY OF THE INVENTION

According to the present invention, when displaying a window on a screen in response to a request from an application program, a display position of the window on the screen is controlled based on data related to a center point of vision stored in a center point definition table.

These and other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 3A is a diagram illustrating the technique of determining the display position of the window based on the center point of vision.

FIG. 3B is a diagram illustrating the technique of determining the display position of the window based on the center point of vision.

FIG. 4 shows, by way of example, the contents of a center point definition table 202.

FIG. 12 shows, by way of example, the contents of a screen management table 1101 shown in FIG. 11.

FIG. 13A is a diagram showing an example of the display of a new window and a related window according to the first embodiment.

FIG. 13B is a diagram showing an example of the display of a new window and a related window according to the second embodiment.

FIG. 15A shows, by way of example, the contents of the window management table 203 before the display position of the new window is calculated.

FIG. 15B shows, by way of example, the contents of the screen management table 1101 used for determining the point of origin of the new window.

FIG. 15C shows, by way of example, the contents of the window management table 203 after the display position of the new window is calculated.

DETAILED DESCRIPTIONS

Exemplary embodiments of the present invention, the window display control program, the window display control method, and the window display control device are explained below with reference to the accompanying drawings.

Figure 1A:
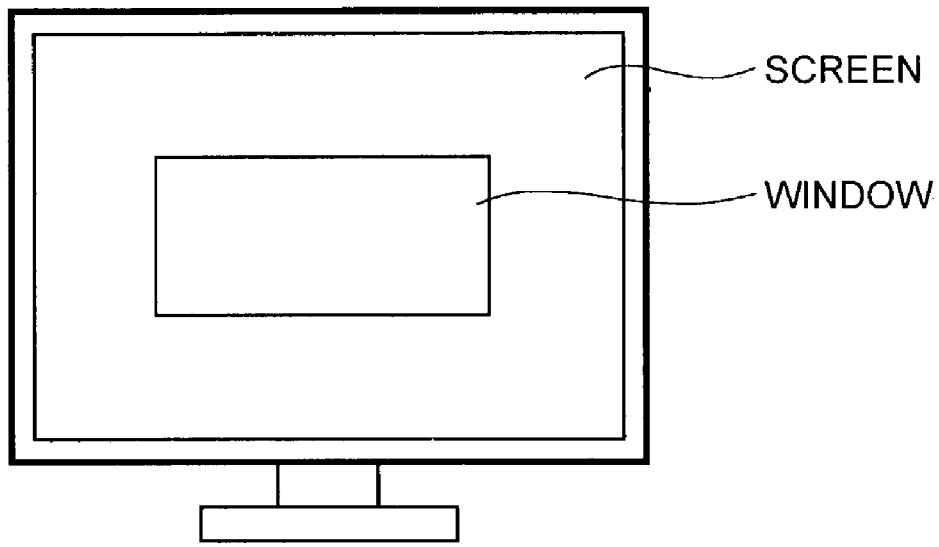
FIG. 1A shows the positioning of a window at the center of the display screen in the conventional art.
Figure 1B:
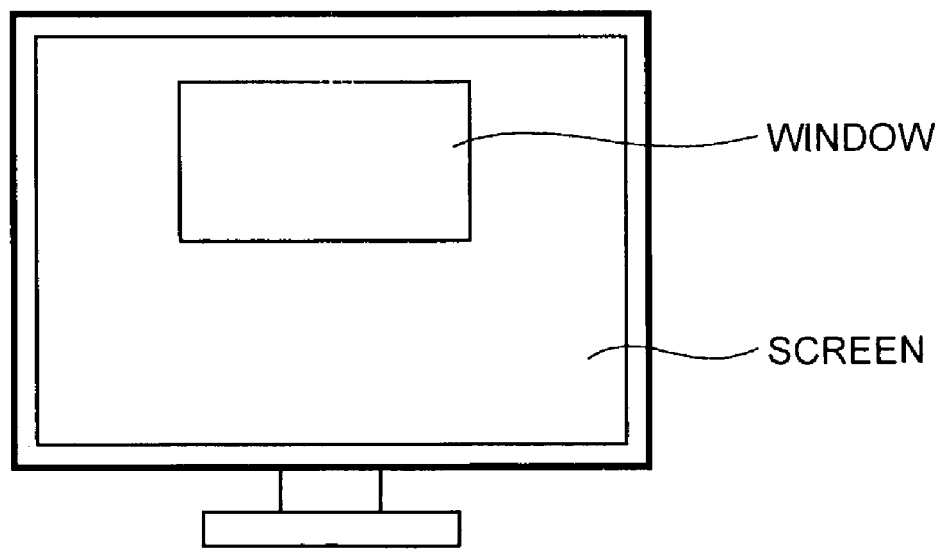
FIG. 1B shows the positioning of a window in a first embodiment of this invention.

A description will now be given of the positioning of a window according to a first embodiment of this invention. FIG. 1A shows the positioning of a window at the center of the display screen in the conventional art. FIG. 1B shows the positioning of a window in a first embodiment of this invention.

As shown in FIG. 1B, the window is positioned on the upper portion of a desktop computer's screen to match the point of vision of the user (hereinafter "point of vision"). The positioning of the window on the upper portion of the screen (refer to FIG. 1B) is in contrast with the positioning of the window on the center of the screen in the conventional art (refer to FIG. 1A).

In this manner, it is possible to display a window matching with the point of vision, reduce displacement in the point of vision, and display an easily viewable window.

Figure 2:
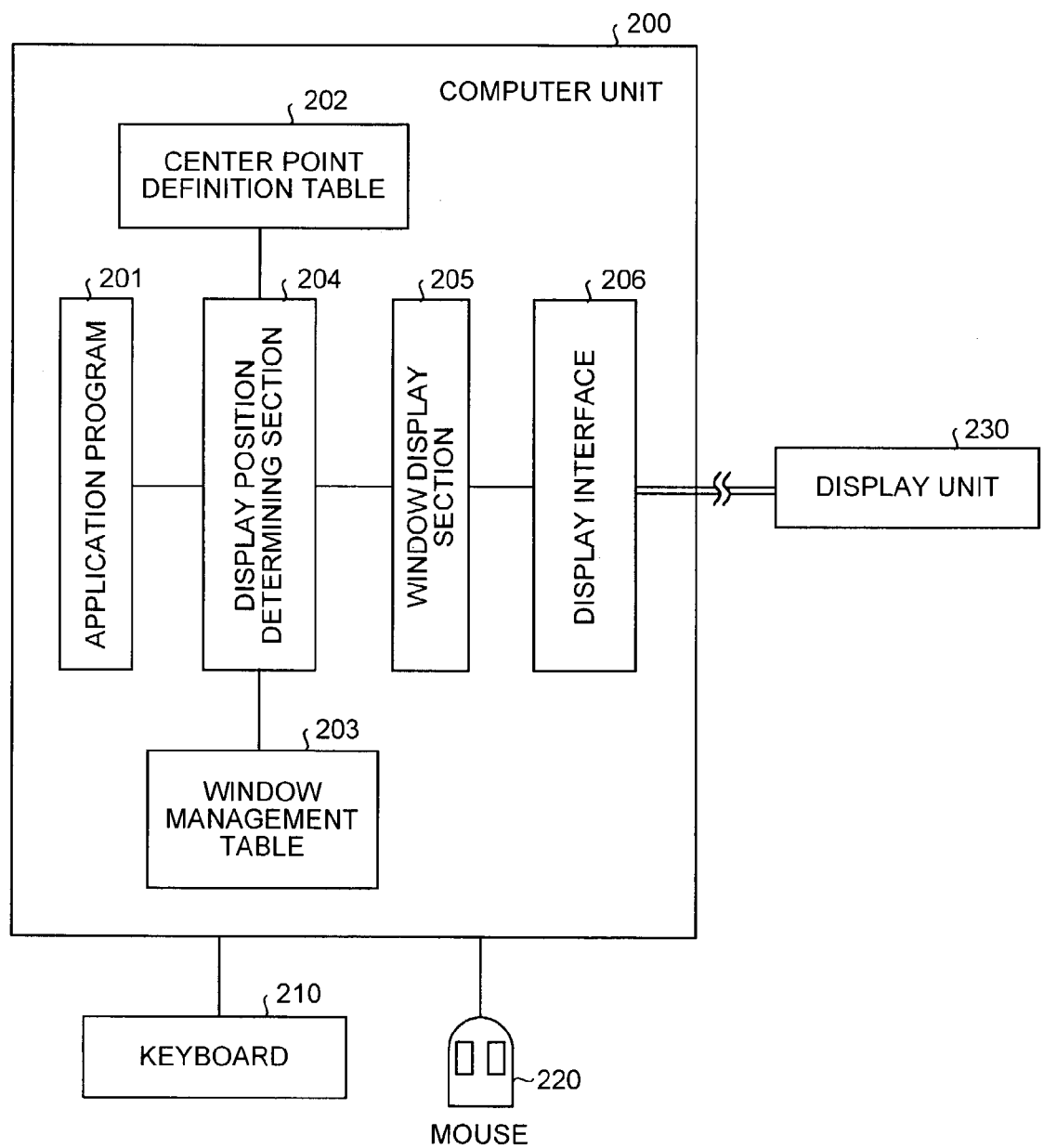
FIG. 2 is a functional block diagram that explains the configuration of a window display control device according to the first embodiment.

Next, the configuration of a window display control device of the first embodiment will be described. FIG. 2 is a functional block diagram that explains the configuration of a window display control device according to the first embodiment. The window display control device consists of a computer unit 200, a keyboard 210, a mouse 220, and a display unit 230.

The computer unit 200 is the main unit of the window display control device. The computer unit 200 determines the display position of the window such that the window is displayed matching with the point of vision on the display unit 230. More specifically, a center point definition table 202 stores the data related to the center point of the screen that matches with the point of vision for each type of display unit. The computer unit 200 determines the display position of the window based on the data stored in the center point definition table 202.

Instructions and data are input to the computer unit 200 through the keyboard 210. The keyboard 210 is also used to input the name or type of the display unit.

The mouse 220 is used for specifying an optional display position of the window on the screen. In addition, the mouse 220 is used for specifying the display position matching with the point of vision and the like. The mouse 220 may also be operated for moving the cursor of the display unit 230 in order to input the x and y coordinates on the screen.

First, the computer unit 200 determines the display position of the window. Then, the display unit 230 displays the window in the position determined by the computer unit 200. In addition, the cursor is used to specify the position on the screen matching with the point of vision. The position of the cursor is moved by moving the mouse 200.

Next, the configuration of computer unit 200 will be explained. As shown in FIG. 2, the computer unit 200 consists of an application program 201, a center point definition table 202, a window management table 203, a display position determining section 204, a window display section 205, and a display interface 206.

The application program 201 is an optional program that displays the window on the display unit 230. A window is normally used for displaying the process result, requesting the input to the user, confirming the results of the operation, and the like.

The center point definition table 202 stores data related to the point of vision for all types of display units. The computer unit 200 determines the display position of the window that is displayed on the display unit 230 based on the data stored in the center point definition table 202.

The window management table 203 stores data related to the window that is displayed on the display unit 230. More specifically, the window management table 203 stores data related to the size of the window, the coordinates of the origin of the window, and the like.

The display position determining section 204 obtains the request for positioning the window from the application program 201. Then, the display position determining section 204 determines the display position of the window based on the data stored in center point definition table 202 and the window management table 203. Following this, the display position determining section 204 sends a request to the window display section 205 for displaying the window in the determined position.

The window display section 205 creates the window to be displayed on the display unit 230. Then, the window display section 205 transmits the data related to the window to the display unit 230 through the display interface 206. Following this, the display unit 230 displays the window.

The display interface 206 controls the operation and performs the initialization, repair and the like of the display unit 230. In addition, the display interface display interface 206 displays the window generated by the window display section window display unit 205 on the display unit 230.

Next, the technique of determining the display position of the window based on the center point of vision will be explained using FIGS. 3A and 3B. A in FIG. 3A indicates the center point on the screen matching with the point of vision. The distance from A towards the left, right, top, and bottom of the screen are indicated by ax1, ax2, ay1, and ay2 respectively.

B in FIG. 3B indicates the center point of the display window. The distance from B towards the left, right, top, and bottom of the display window are indicated by bx1, bx2, by1, and by2 respectively. The positions of bx1, bx2, by1, and by2 are determined such that $$ax1:ax2=bx1:bx2 \text{ or } ay1:ay2=by1:by2.$$

In this manner, the display position of the window is determined such that B coincides with A.

Next, an example of the center point definition table 202 shown in FIG. 2 will be explained. FIG. 4 shows, by way of example, the contents of the center point definition table 202. The center point on the screen matching with the point of vision for a device is shown by the percentage of the horizontal length (hereinafter "X") and the vertical length of the screen (hereinafter "Y").

For example, in a cathode ray tube (CRT) display unit, the center point of vision is at a position where X and Y are 50% and 65% respectively. In case of a liquid display unit, the center point of vision is at a position where X and Y are 50% and 70% respectively. In case of a projector, the center point of vision is at a position where X and Y are 50% and 35% respectively. Further, in case of a first display unit, the center point of vision is at a position where X and Y are 50% and 40% respectively. In case of a second display unit, the center point of vision is at a position where X and Y are 50% and 40% respectively. Likewise, the center points of vision for other display units are also stored in the center point definition table 202.

Figures 5, 6A, 6B:
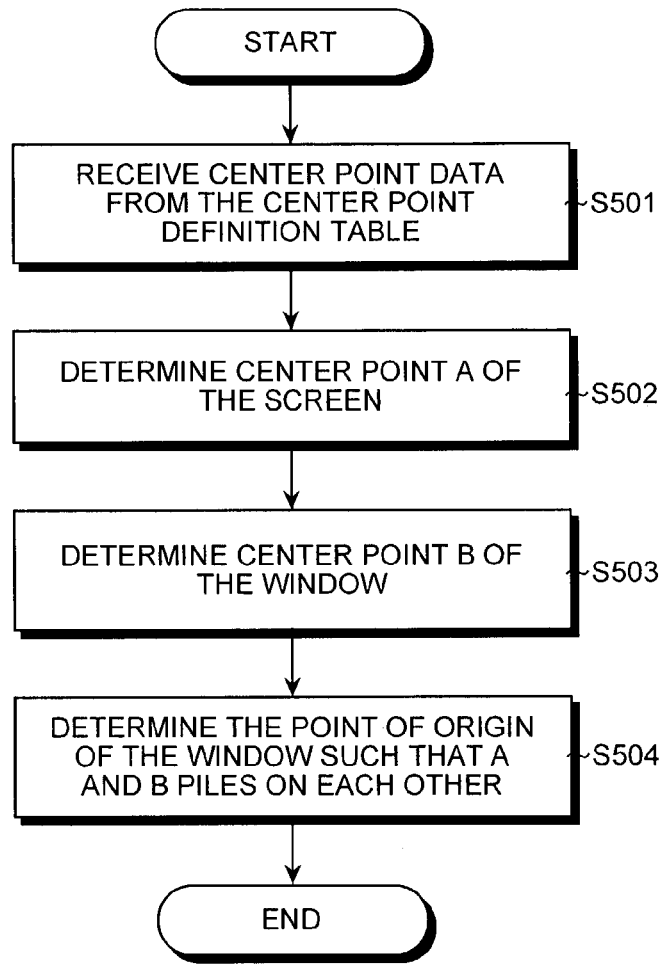
FIG. 5 is a flowchart that shows the processes conducted by a display position determining section 204.
FIG. 6A shows, by way of example, the contents of a window management table 203 before the point of origin of the window is determined.
FIG. 6B shows, by way of example, the contents of the window management table 203 after the point of origin of the window is determined.

FIG. 5 is a flowchart that shows the processes conducted by the display position determining section 204. First, the display position determining section 204 receives the center point data from the center point definition table 202 (step S501). Then, the display position determining section 204 determines the center point A of the display screen based on the data related to the size of the display screen and the center point stored in the center point definition table 202 (step S502).

Next, the display position determining section 204 determines the center point B based on the data related to the size of the window stored in the window management table 203 (step S503). Finally, the display position determining section 204 determines the point of origin of the window based on the point where A and B piles on each other (step S504).

Next, the processes conducted by the display position determining section 204 will be explained with a concrete example. It is assumed here that the horizontal length AX and the vertical length AY of the screen are 640 pixels and 480 pixels respectively.

The center point of vision of the liquid crystal display unit stored in the center point definition table 202 where X and Y are 50% and 70% respectively is taken into consideration here. FIG. 6A shows, by way of example, the contents of the window management table 203 before the point of origin of the window is determined. FIG. 6B shows, by way of example, the contents of the window management table 203 after the point of origin of the window is determined. As shown in FIG. 6A, the horizontal length and the vertical length of the window are 200 pixels and 100 pixels, however, the point of origin of the window is not defined.

With reference again to the flowchart shown in FIG. 5, first, the display position determining section 204 receives the center point data of the liquid crystal display unit from the center point definition table 202 (step S501). Then, the display position determining section 204 determines the coordinates of A, which is a center of the display screen, from the data related to the center point and the size of the screen where AX=640 pixels and AY=480 pixels (step S502). In this case, X and Y are 50% and 70% respectively and AX and AY are 640 pixels and 480 pixels respectively. More specifically, coordinates of $$A=(640\times 0.50, 480\times 0.70)=(320, 336)$$

Further, the display position determining section 204 determines the coordinates of B, which is a center of the window, from the data related to the center point of the screen and the size of the window (step S503). In this case, X and Y are 50% and 70% respectively and BX and BY are 200 pixels and 100 pixels respectively. More specifically, coordinates of $$B=(200\times 0.50, 100\times 0.70)=(100, 70)$$

Next, the display position determining section 204 calculates the difference between A and B and this difference indicates the point of origin of the window to be displayed. More specifically, difference between A and B will be:

$$A-B=(320, 336)-(100, 70)=(220, 266).$$

Thus, window origin, i.e., the origin of the window to be displayed on the display screen, shown in the window management table 203 in FIG. 6B is obtained.

The configuration of computer unit 200 has been explained till now from the functional point of view, but in reality the functional units are made from pieces of software. Next, the software configuration of windows display control unit according to the first embodiment will be explained in detail.

Figure 7A:
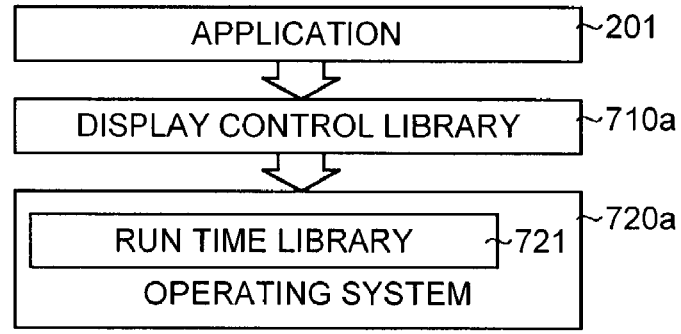
FIG. 7A illustrates an example of a software configuration of computer unit 200 in a window system 1.

FIG. 7A illustrates an example of a software configuration of computer unit 200 in a first window system. The application program 201 is executed on the computer unit 200. The computer unit 200 is realized by a display control library 710*a*, a run time library 721, and an operating system 720*a*. The display control library 710*a* is present between the run time library 721 and the application program application 201 and primarily serves to display the window. The run time library 721 is executed on the operating system 720*a*. The run time library 721 and the display control library 710*a* correspond to the window display section 205 and the display position determining section 204, shown in FIG. 2, respectively.

The application program 201 does not display the window by directly calling the run time library 721. Instead, the application program 201 calls the display control library 710*a*. Then, the application program 201 calls the run time library 721 after the display control library 710*a* determines the display position of the window based on the point of focus.

Figure 7B:
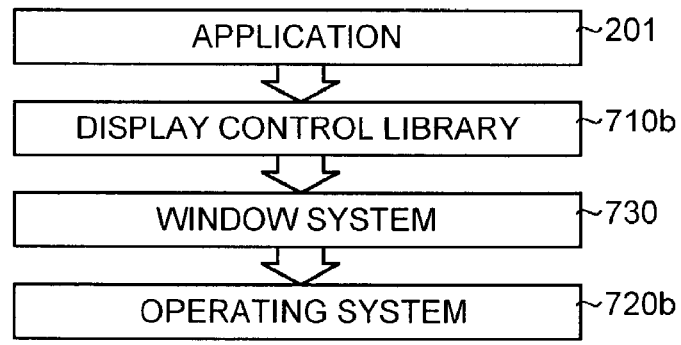
FIG. 7B shows another example of the software configuration of a computer unit 200 in a window system 2.

FIG. 7B shows another example of the software configuration of a computer unit 200 in a second window system. The application program 201 is executed on the computer unit 200. The computer unit 200 is realized by a display control library 710*b*, a window system 730, and an operating system 720*b*. The display control library 710*b* is present between the application program 201 and a window system 730. The window system 730 can be used in the operating system 720*b*. Here, the window system 730 and the display control library 710*b* correspond to the window display section 205 and the display position determining section 204, shown in FIG. 2, respectively.

Further, the window system 730 is not limited to being realized in a single computer unit 200. The window system 730 may also be realized in a plurality of computer units 200 that are connected to a network in a client-server system.

Figure 7C:
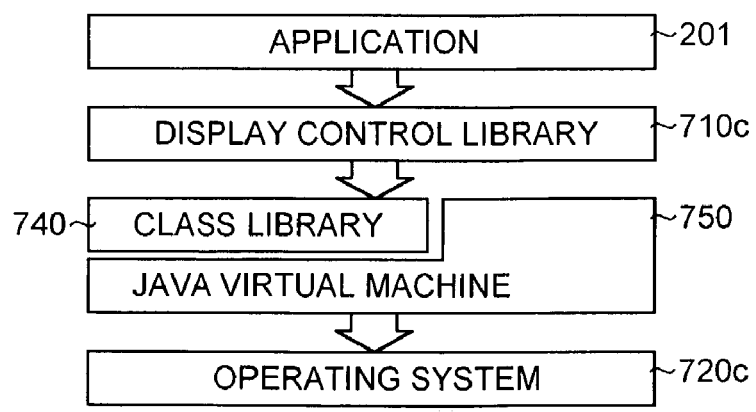
FIG. 7C shows the software configuration of computer unit 200 in a java (a registered trademark) system.

FIG. 7C shows the software configuration of computer unit 200 in a java (a registered trademark) system. The application program 201 is executed on the computer unit 200. The computer unit 200 is realized by a display control library 710*c*, a class library 740, a virtual java machine 750, and an operating system 720*c*. The display control library 710*c* is present between the application program 201 and a class library 740. The class library 740 is executed on the virtual java machine 750. The virtual java machine is accessed by the operating system 720*c*.

Figure 8:
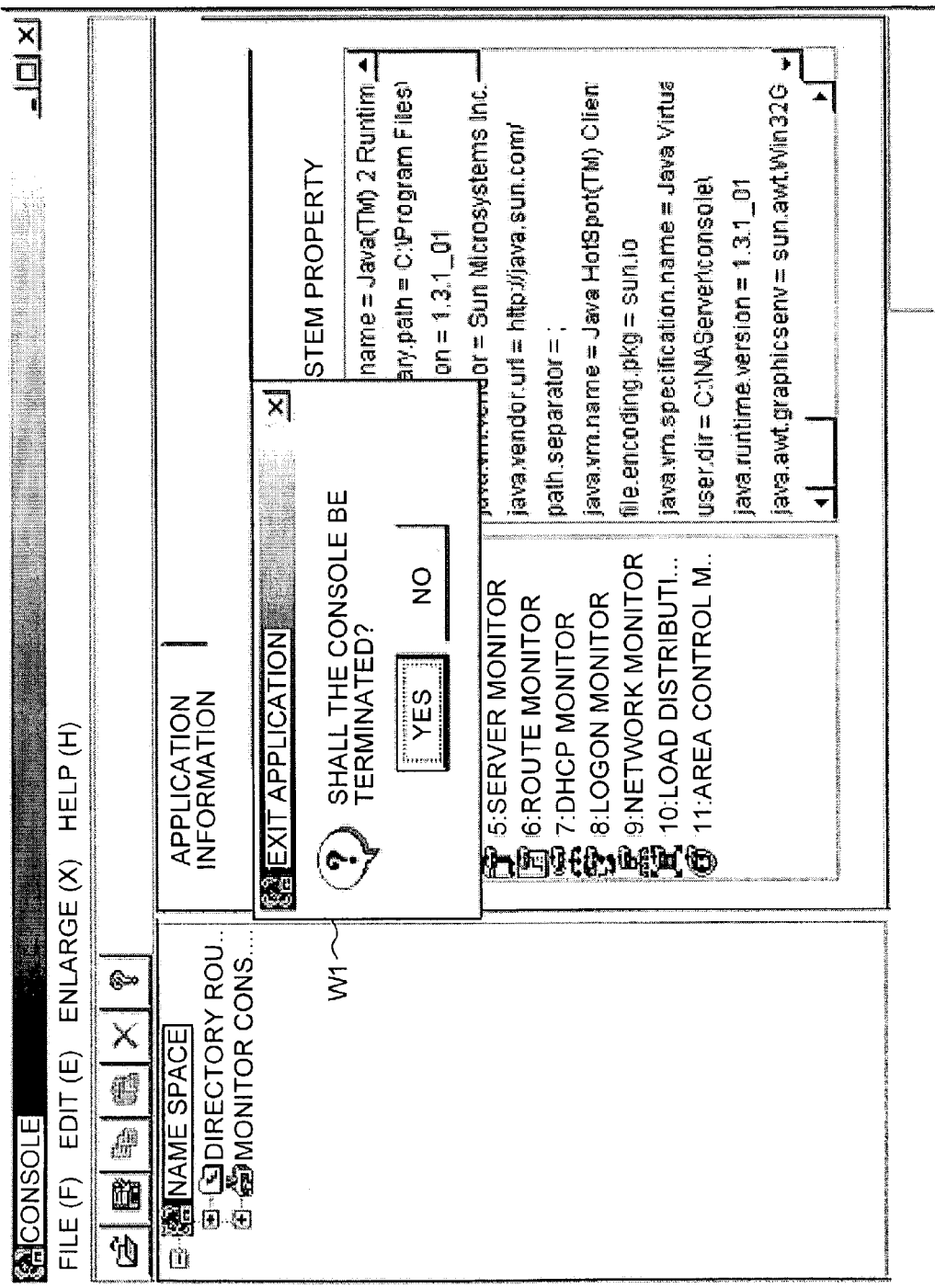
FIG. 8 shows an example of display of a window according to the first embodiment.

FIG. 8 shows an example of display of a window according to the first embodiment. It is assumed that the point of vision is on the upper portion of the display screen. In this case, as shown in FIG. 8, a new window W1 is displayed in the upper portion rather than the middle of the display screen. As a result, the displacement of the point of vision is reduced and an easily viewable window can be displayed.

Figure 9A:
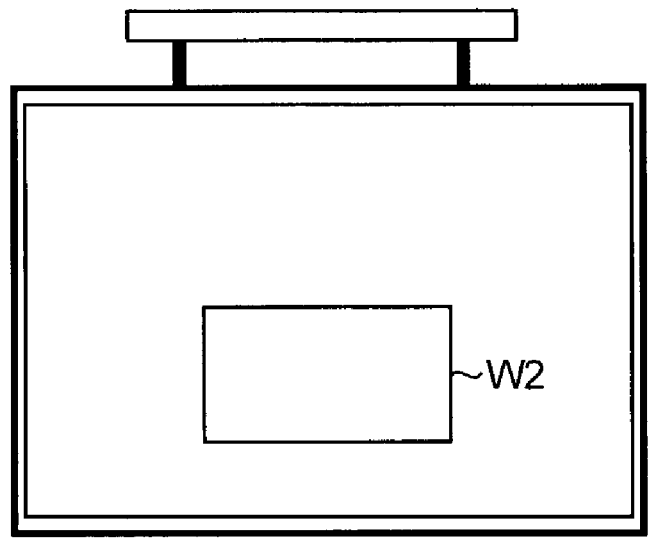
FIG. 9A shows an example of display of a window in a projector suspended from the roof.

FIG. 9A shows an example of display of a window in a projector of the type in which the screen is suspended from the roof. The tendency of watchers is normally to focus on the lower portion of the screen. Therefore, the display position determining section 204 displays a new window W2 towards the lower portion of the screen. As a result, the displacement of the point of vision is reduced and an easily viewable window can be displayed.

Figure 9B:
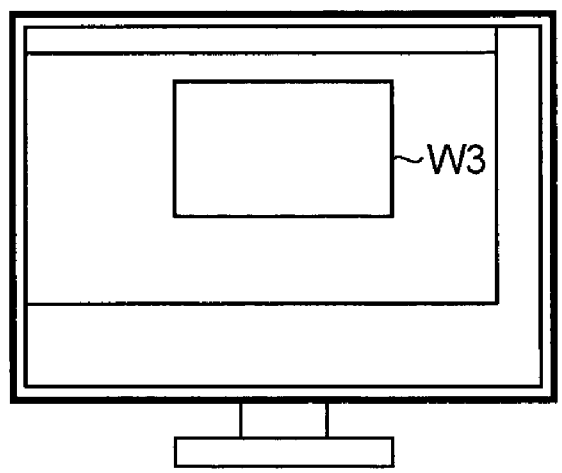
FIG. 9B shows an example of display of a window in a desktop.

FIG. 9B shows an example of display of a window on a display unit of a desktop computer. The desktop computer user normally tends to view the upper portion of the screen from an upper position. Therefore, in case of the desktop the display position determining section 204 displays a new window W3 at the upper portion of the screen.

The point of vision differs depending on conditions such as type of the display unit, environment of the display unit, display of other windows and the like. Therefore, it is preferable that the display position of the window is determined in consideration with these conditions.

In the explanation given till now the center point definition table 202 has been considered as a table in which the data has already been created. However, the point of vision is subject to change depending on the environment of the display unit. Therefore, it is preferable to modify the data stored in the center point definition table 202.

Figure 10:
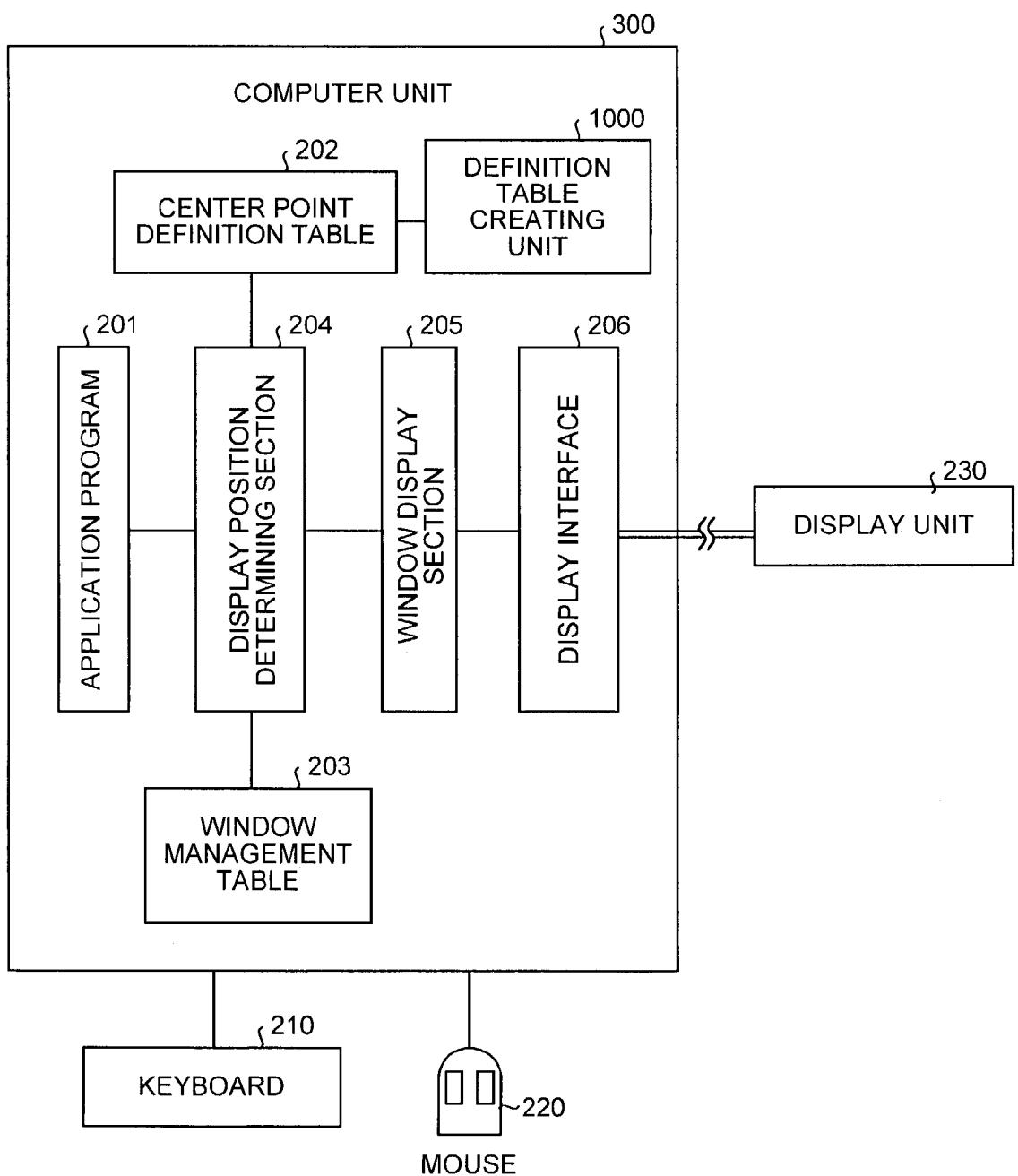
FIG. 10 is a functional block diagram that explains the configuration of the window display control device having the function of creating the center point definition table 202.

FIG. 10 is a functional block diagram that explains the configuration of a window display control device having the function of creating the center point definition table. This window display control device is structured to cope, when there is change in the point of vision. In FIG. 10, same reference numerals have been used to the structural elements that have the same structure or same function as those shown in FIG. 2 and, explanation of those parts will be omitted to avoid simple repetition of explanation.

In this windows display control unit, a computer unit 300 comprises of the application program 201, the center point definition table 202, the window management table 203, the display position determining section 204, the window display section 205, the display interface 206, and a definition table creating unit 1000.

The definition table creating unit 1000 changes the data of the center point definition table 202 based on the instructions given by the operator. More specifically, the operator first holds the mouse 220 and moves the cursor to specify the position (i.e., coordinates) that matches with the point of vision on the display unit 230. The operator may be made to input the name of the display unit using the keyboard 210.

The definition table creating unit 1000 creates the data of the center point based on the input coordinates and the size of the physical screen. Then, the definition table creating unit 1000 stores the created data and the name of the display unit in the center point definition table 202. In this way, the operator can modify the data of the center point definition table 202 with simple operations.

Thus, in the first embodiment, a configuration is provided such that a window is displayed such that it matching with the point of vision. As a result, the displacement of the point of vision is reduced and an easily viewable window is displayed.

The first embodiment is concerned more with the display of a single window. During display of multiple windows, it is preferable that a new window is always displayed at the center point of focus and that the new window does not pile on the already displayed related window.

In this context, a second embodiment of the invention relates to a window display control device that reduces the displacement of the point of vision when displaying multiple windows. The window display control device displays the related windows such that the windows don't pile on each other. More specifically, the related windows are moved to accommodate the display of the new window matching with the point of vision.

Figure 11:
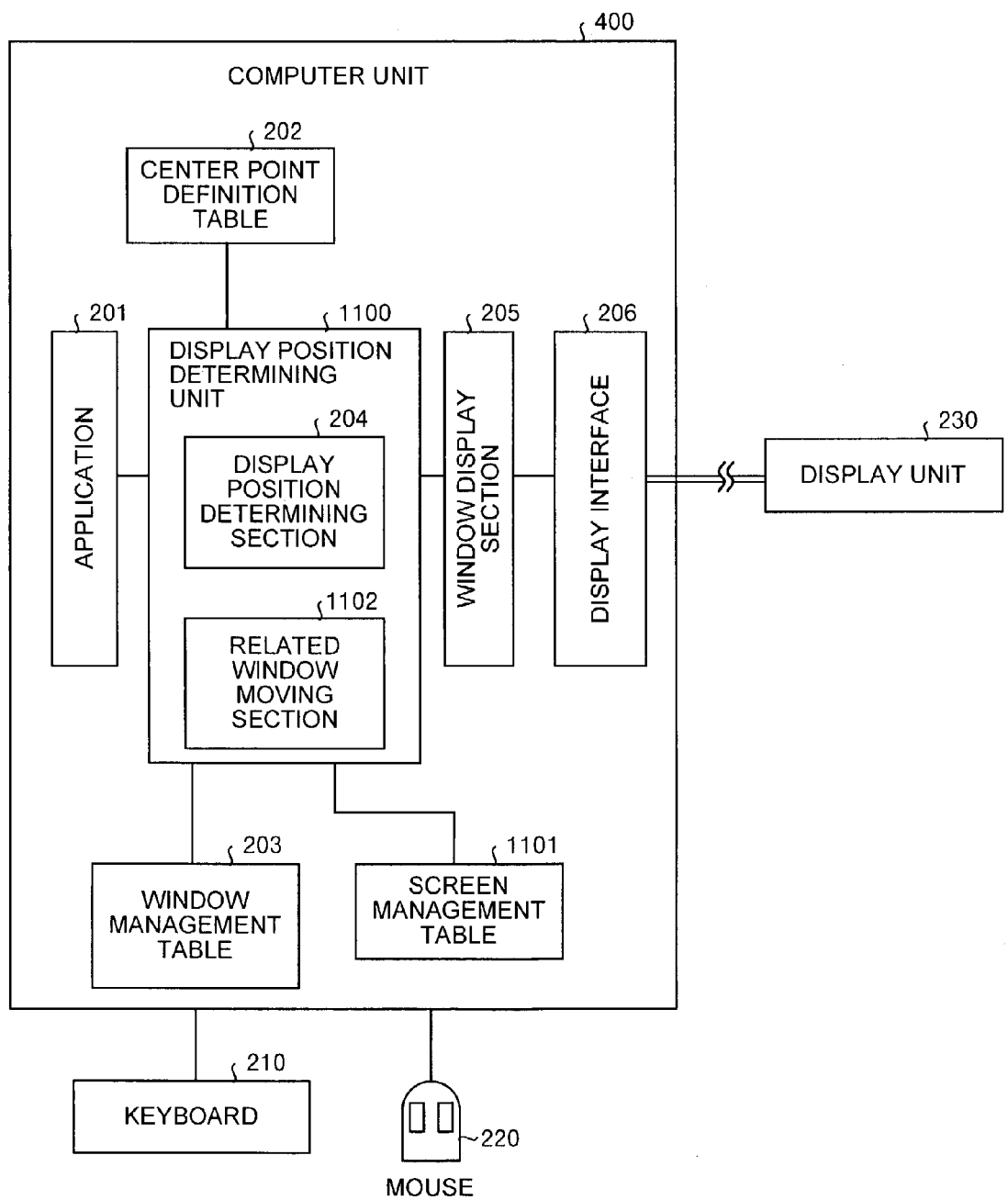
FIG. 11 is a functional block diagram that explains the configuration of a window display control device according to a second embodiment of the invention.

The configuration of the window display control device related to the second embodiment will be explained. FIG. 11 is a functional block diagram that explains the configuration of the window display control device according to the second embodiment. In FIG. 11, same reference numerals have been used to the structural elements that have the same structure or same function as those shown in FIG. 2 and, explanation of those parts is omitted to avoid simple repetition of explanation.

In this window display control device, a computer unit 400 consists of the application program 201, the center point definition table 202, the window management table 203, a display position determining unit 1100, the window display section 205, the display interface 206, and a screen management table 1101.

The display position determining unit 1100 further consists of the display position determining section 204 and a related window moving section 1102. The application program 201 that is executed on the computer unit 200 sends a request to display the window at the center of the screen to the display position determining unit 1100. On receiving the request, the display position determining unit 1100 determines the position to which the related window has to be moved based on the data stored in the center point definition table 202, the window management table 203, and the screen management table 1101.

The related window moving section 1102 moves the related window based on the display position of the window determined by the section 204 and the data related to the size and barycenter of the display screen that are stored in the screen management table 1101.

FIG. 12 shows, by way of example, the contents of the screen management table 1101. The screen management table 1101 stores the size and the barycenter of the screen. In this example, the horizontal length and the vertical length of the screen are 640 pixels and 480 pixels respectively and the coordinates of the barycenter of the screen are 320 and 240.

Next, the explanation of how to reduce the piling of the new window on the related window will be given. FIG. 13A shows an example of how a window is displayed according to the first embodiment. FIG. 13B shows an example of how the piling of the new window and the related window is reduced according to the second embodiment. As shown in FIG. 13A, in the first embodiment, a new window W4 is displayed in such a manner that it piles on a related window W5. On the other hand, as shown in FIG. 13B, in the second embodiment, when displaying a new window W6, an already displayed related window W7 is moved to the bottom right-hand side of the screen such that the new window W6 does not pile on the new window. The center point definition table 202 determines the position to which the related window W7 is to be moved.

Figure 14:
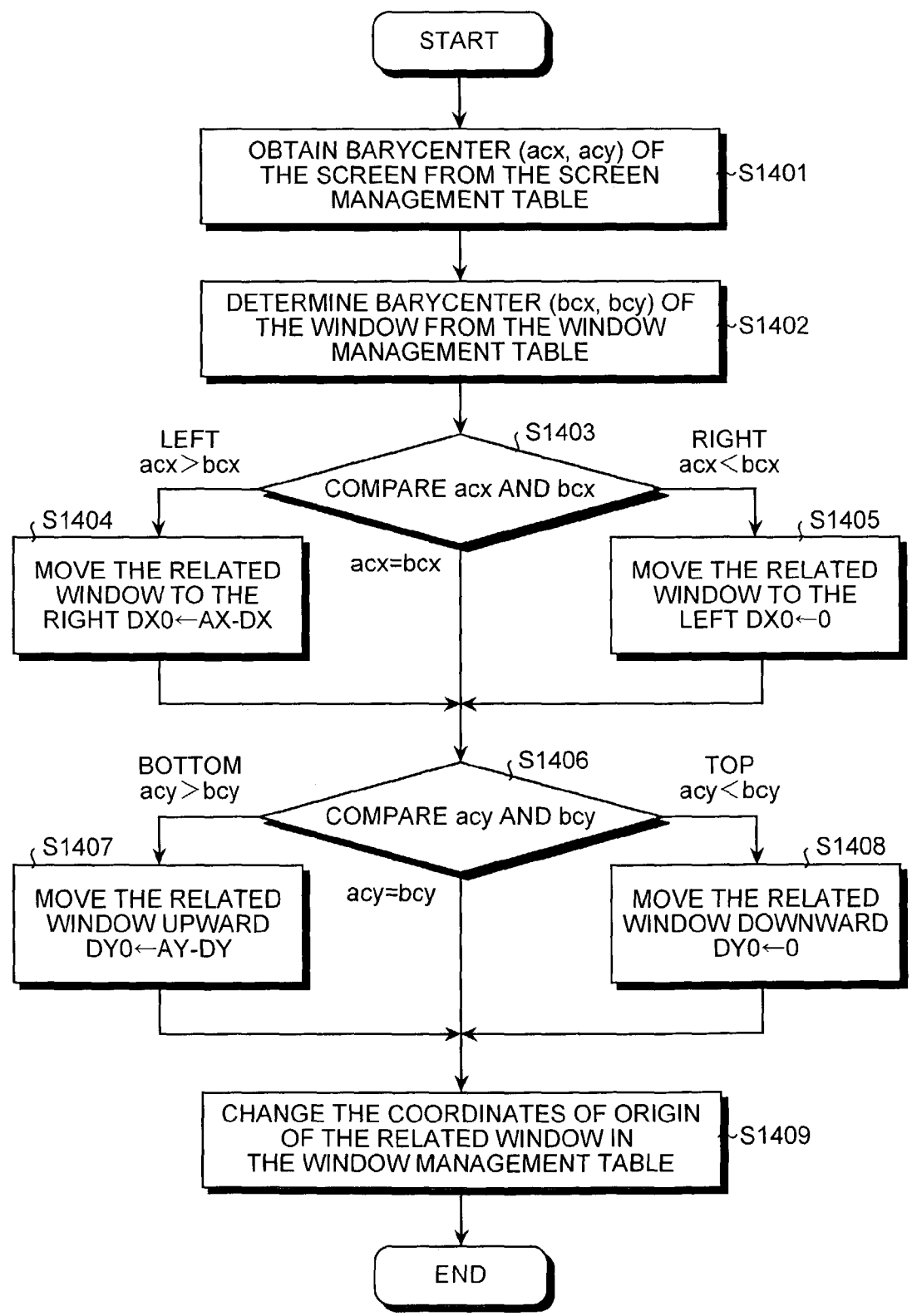
FIG. 14 is a flowchart that illustrates the processes conducted by a related window moving section 1102 shown in FIG. 11.

FIG. 14 is a flowchart that illustrates the processes conducted by the related window moving section 1102. It is assumed here that the coordinates of the barycenter of the screen along the x-axis and y-axis are acx and acy respectively and, the coordinates of the barycenter of the new window along the x-axis and y-axis are bcx and bcy respectively. First, the related window moving section 1102 obtains the coordinates acx and acy from the screen management table 1101 (step S1401). Then, the related window moving section 1102 determines the coordinates bcx and bcy from the data in the window management table 203 (step S1402). The related window moving section 1102 may also obtain the coordinates bcx and bcy based on the size of the window and the coordinates of the point of origin.

The related window moving section 1102 compares acx and bcx and determines whether the new window is displayed towards the right or the left of the screen (step S1403). If the new window is displayed towards the left of the screen, then the related window is moved towards the right of the screen (step S1404). Hereinafter, the x-coordinate and y-coordinate of the point of origin of the related window is indicated as DX0 and DY0 respectively, and x-coordinate and y-coordinate of the point of origin of the new window is indicated as BX0 and BY0 respectively. Moreover, the horizontal and the vertical length of the related window is DX and DY respectively, the horizontal and the vertical length of the new window is BX and BY respectively. With this data, the related window moving section 1102 calculates the difference between AX and DX to obtain the coordinate DX0 (DX0=AX−DX).

On the other hand, if the new window is displayed towards the right of the screen, the related window is moved towards the left of the screen (step S1405). In this case, the value of DX0 becomes zero. If the new window is displayed in the center of the screen, the related window is not moved.

Similarly, the related window moving section 1102 compares acy and bcy and determines whether the new window is displayed towards the top or the bottom of the screen (step S1406). If the new window is displayed towards the bottom of the screen, the related window is moved upwards (step S1407). Then, the related window moving section 1102 calculates the difference between AY and DY to obtain the coordinate DY0 (DY0=AY−DY).

On the other hand, if the new window is displayed towards the top of the screen, the related window is moved to the bottom of the screen (step S1408). In this case, the value of DY0 becomes zero. If the new window is displayed in the center of the screen, the related window is not moved. Finally, the related window moving section 1102 changes the coordinates of the point of origin of the related window to the derived values of DX0 and DY0 (step S1409).

Next, the procedural steps of the related window moving section 1102 will be explained with a concrete example. FIGS. 15A and 15C show, by way of examples, the contents of the window management table 203 before and after the display position of the new window are calculated, respectively. FIG. 15B shows, by way of example, the contents of the screen management table 1101 used for determining the point of origin of the new window. As shown in FIG. 15A, the values of DX0 and DY0 in the window management table 203 are initially 0. As shown in FIG. 15B, the derived values of acx and acy are 320 and 240 respectively, in the screen management table 1101. Then, the related window moving section 1102 calculates the coordinate bcx of the barycenter of the window by the equation:

$$bcx=BX0+BX/2=200+200/2=300.$$

Then, the related window moving section 1102 compares acx and bcx (step S1403). In this case, since acx is 320 and bcx is 300, acx is greater than bcx. As a result, the related window is moved towards the right of the screen (step S1404). In other words, the related window moving section 1102 calculates the difference between AX and DX to obtain DX0 (DX0=AX−DX). In this case, the value of DX0 is 40 as the value of AX and DX are 640 and 600 respectively.

In the same manner, bcy is derived by the equation:

$$bcy=BY0+BY/2=210+100/2=260.$$

Then, the related window moving section 1102 compares acy and bcy (step S1406). Since acy and bcy are 240 and 260 respectively, acy is lesser than bcy. As a result, the related window is moved towards the bottom of the screen (step S1408). In other words, the value of DY0 becomes zero. As a result, as shown in FIG. 15C, the x and y coordinates of the related window becomes 40 and 0 respectively (step S1409).

Figure 16:
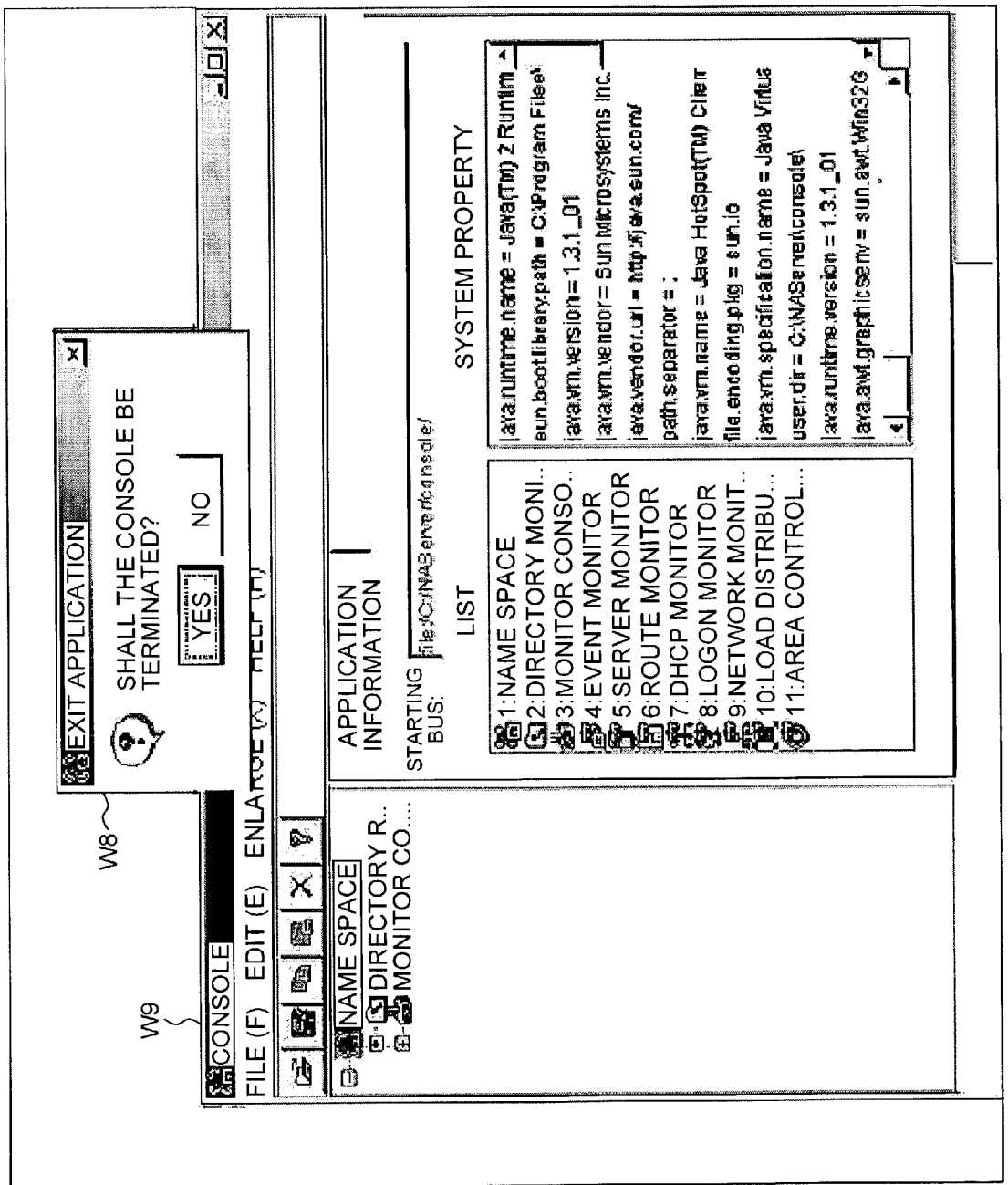
FIG. 16 shows an example of display of a new window on top of a related window in the second embodiment.

FIG. 16 shows an example of piling of a new window on a related window in the second embodiment. A related window W9 is moved towards the bottom right-side of the screen S such that a new window W8 and the related window W9 do not completely pile on each other.

Thus, in the second embodiment of the invention, the related window moving section 1102 moves the related window based on the display position of the new window. In this manner, the new window does not completely pile on the related window. In addition, the displacement of the point of focus is reduced and an easily viewable window is displaced.

It is assumed in the first and the second embodiment that the computer unit 200 executes the window display control program. However, the display unit 230 may be made to execute the window display control program. A third embodiment of this invention relates to a window display control device having a display unit 1700 that executes the window display control program.

Figure 17:
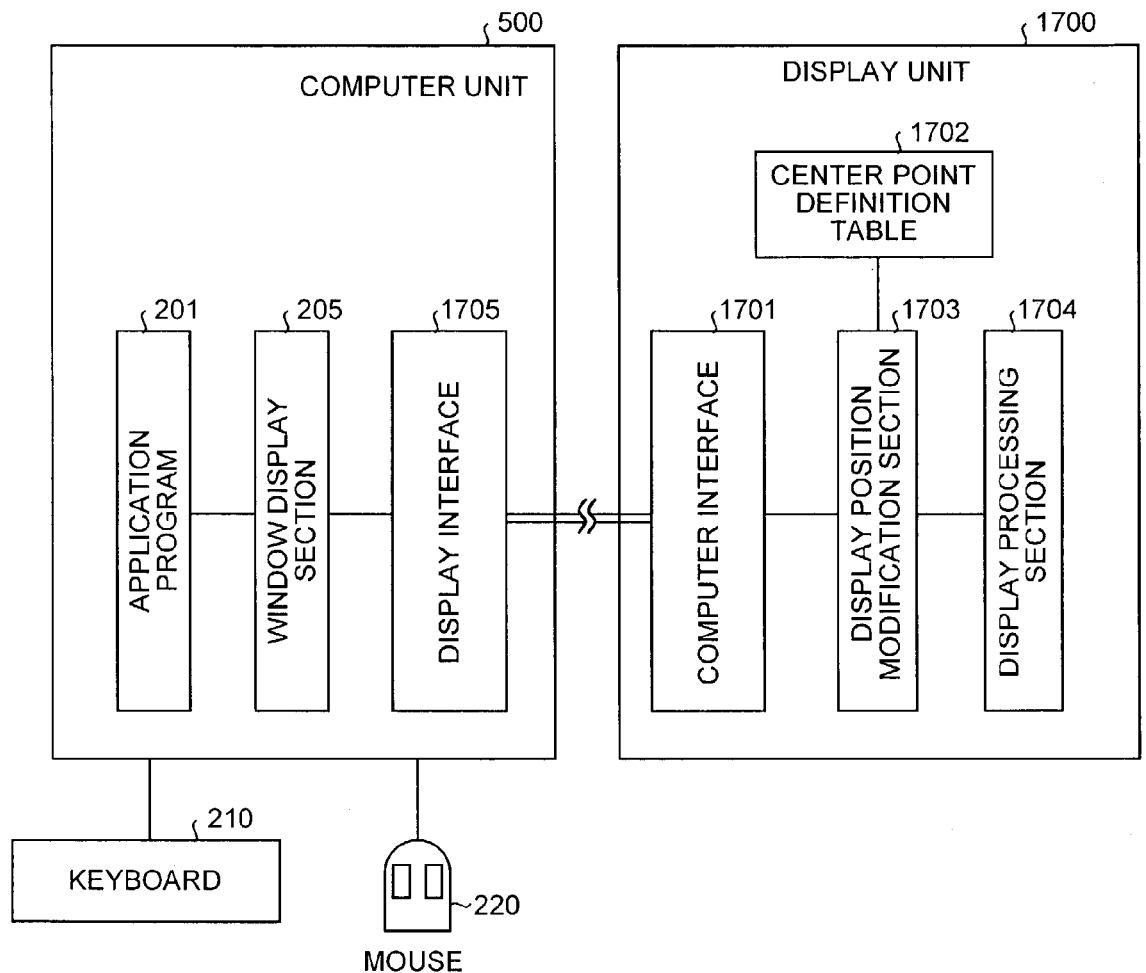
FIG. 17 is a functional block diagram that illustrates the configuration of a window display control device according to a third embodiment of this invention.

FIG. 17 is a functional block diagram that illustrates the configuration of a window display control device according to the third embodiment. In FIG. 17, same reference numerals have been used to the structural elements that have the same structure or same function as those shown in FIG. 2 and, explanation of those parts will be omitted to avoid simple repetition of explanation.

The window display control device comprises of a computer unit 500 and a display unit 1700. The computer unit 500 consists of a display interface 1705. The display unit 1700 consists of a computer interface 1701, a center point definition table 1702, a display position modification section 1703, and a display processing section 1704.

The computer interface 1701 receives the request for displaying the window at the center of the screen from the display interface 1705 of the computer unit 500. The display interface 1705 sends the data related to the display of the window at the center of the screen to the computer interface 1701 of the display unit 1700. The computer interface 1701 sends the received data to the display position modification section 1703.

The display position modification section 1703 modifies the display position of the window based on the center point definition table 1702. Following this, the display position modification section 1703 requests the display of window to the display processing section 1704. Then, the display processing section 1704 displays the window at a desired position on the screen.

Figure 18:
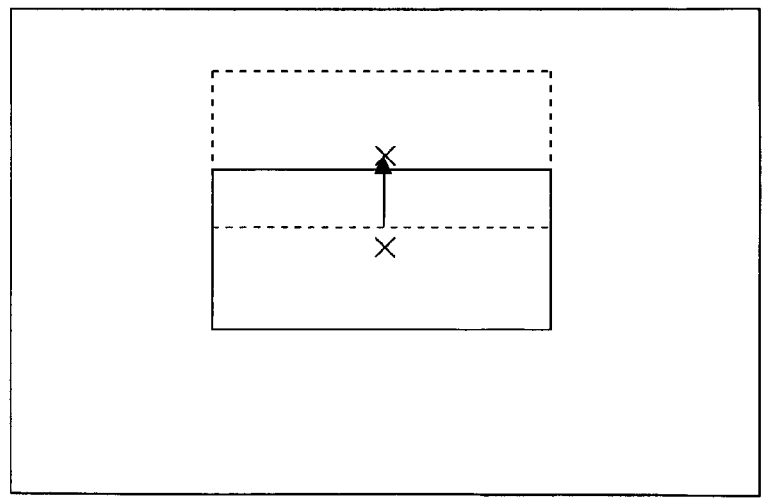
FIG. 18 illustrates the display of a window according to the third embodiment.

FIG. 18 illustrates the display of window according to the third embodiment. The window that is displayed before and after the change in position is indicated by a bold line and a dotted line respectively. The display unit 1700 as explained receives the request to display the window in the center of the screen from the application program 201. Then, the display unit 1700 adjusts the display position by moving the window to the top based on the point of vision. In addition, the coordinates of the window after the change in position are changed to the original values before the change in position.

Thus, in the third embodiment, the display unit controls the display of the window instead of the computer unit 500. As a result, the displacement in the point of vision of the user is reduced and an easily viewable window is displayed.

According to the invention, a window display control program controls the display position of the window based on the center point of focus stored in the center point definition table. The window display control program achieves the effect of displaying a window matching with the point of vision of the user such that the displacement in the point of vision is reduced and an easily viewable window is displayed.

Furthermore, the window display control program achieves the effect of receiving the input of the center point of focus through the screen and registers the same in the center point definition table. In addition, the window display control program registers the center point of focus that corresponds with a display unit in the center point definition table.

Furthermore, the window display control program has the effect of achieving of controlling the display position of a first window and second window, where the second window is displayed newly on the first window in the screen. More specifically, the window display control program moves the display position of a first window and controls the display position of a second window based on the center point of vision stored in the center point definition table, such that the piling of the first window and the second window is reduced. Therefore, the window display control program can efficiently reduce the displacement of the point of vision when multiple windows are displayed on the same screen.

Furthermore, a the window display control method has the effect of displaying a window matching with the point of vision such that the displacement in the point of vision is reduced and an easily viewable window is displayed.

Furthermore, a window display control device has the effect of displaying a window matching with the point of vision such that the displacement in the point of vision is reduced and an easily viewable window is displayed.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A computer-readable recording medium that stores therein a computer program that causes a computer to execute control of a display position of a window on a screen in response to a request from an application program, by making a computer execute operations comprising:
   requesting a user to input a desired point on the screen;
   storing data related to coordinates of the desired point on the screen indicated by the user as a center point of vision of the user in a center point definition table, which stores the data related to the center point of vision corresponding to a type of display; and
   controlling the display position of the window on the screen based on the data corresponding to a type of display unit in which the window to be displayed and stored in the center point definition table;
   wherein the user inputs the desired center point of vision by pointing a point on a screen using a specific pointing unit.

2. The computer-readable recording medium according to claim 1, wherein when controlling the display position of a first window while a second window has already been displayed, the display position of the second window is changed, based on the data related to the center point of vision stored in the center point definition table, such that piling of the first window and the second window is reduced.

3. The computer-readable recording medium according to claim 1, wherein the operation of controlling the display position is performed according to a display control library positioned between the application program and a run time library of an operating system.

4. The computer-readable recording medium according to claim 1, wherein the operation of controlling the display position is performed according to a display control library positioned between the application program and a window system that is executed on an operating system.

5. The computer-readable recording medium according to claim 1, wherein the operation of controlling the display position is performed according to a display control library positioned between the application program and a class library that operates on a java virtual machine.

6. A window display control method of controlling a display position of a window on a screen in response to a request from an application program, the window display control method comprising:
   requesting a user to input a desired point on the screen;
   storing data related to coordinates of the desired point on the screen indicated by the user as a center point of vision of the user in a center point definition table, the center point definition table storing data related to the center point of vision corresponding to a type of display unit; and
   controlling the display position of the window on the screen based on the data related to the center point of vision corresponding to a type of display unit in which the window is to be displayed and stored in the center point definition table;
   wherein the user inputs the desired point on the screen by pointing a point on the screen using a specific pointing unit.

7. A window display control device that controls a display position of a window on a screen in response to a request from an application program, the window display control device comprising:
   a center point definition table that stores data related to a center point of vision on the screen corresponding to a type of display unit;
   an input unit for accepting information input by the user; and
   a window display controller that controls the display position of the window on the screen based on the data in the center point definition table;
   wherein the center point definition table stores coordinates of a desired point of the screen in which the user inputs as the center point of vision, the user inputting the desired point by pointing a point on the screen using a specific pointing unit, and the corresponding type of display unit for which the coordinates are being stored.

8. A computer-readable recording medium that stores therein a computer program that causes a computer to execute control of a display position of a window on a screen in response to a request from an application program, by making a computer execute operations comprising:
   requesting a user to input a desired point on the screen;
   storing data related to coordinates of the desired point on the screen indicated by the user as a center point of vision in a center point definition table, and the corresponding type of display for which the desired point is input; and
   controlling the display position of the window on the screen based on the data related to the center point of vision stored in the center point definition table and the corresponding type of display;
   wherein the user inputs the desired point on the screen by pointing a point on the screen using a specific pointing unit.

9. A computer-readable recording medium that stores therein a computer program that causes a computer to execute control of a display position of a window on a screen in response to a request from an application program, by making a computer execute operations comprising:
   reading a center point of vision from a center point definition table, the center point definition table storing data related to coordinates of the desired point on the screen corresponding to a type of display unit;
   determining the display position of the window on the screen based on the data related to the center point of vision that corresponds to a type of display unit in which the window to be displayed and stored in the center point definition table; and
   displaying the window at the determined display position.

10. A window display control method of controlling a display position of a window on a screen in response to a request from an application program, the window display method comprising:
    requesting a user to input a desired point on the screen;

storing data related to coordinates of the desired point on the screen indicated by the user as a center point of vision in a center point definition table, and the corresponding type of display for which the desired point is input; and controlling the display position of the window on the screen based on the data related to the center point of vision stored in the center point definition table and the corresponding type of display;

wherein the user inputs the desired point on the screen by pointing a point on a screen using a specific pointing unit.

11. A window display control method of controlling a display position of a window on a screen in response to a request from an application program, the window display method comprising:

reading a center point of vision from a center point definition table, the center point definition table storing data related to coordinates of the desired point on the screen corresponding to a type of display unit;

determining the display position of the window on the screen based on the data related to the center point of vision that corresponds to the type of display unit in which the window is to be displayed and stored in the center point definition table; and displaying the window at the determined display position.

12. A window display control device that controls a display position of a window on a screen in response to a request from an application program, the window display control device comprising:

a center point definition table that stores data defining a center point on the screen, the center point being related to a center point of vision of a user, and corresponding to a particular type of display unit; and a window display controller that controls the display position of the window on the screen based on the data stored in the center point definition table;

wherein the window display control device determines a type of display unit in which the window is to be displayed, and reads data defining the center point on the screen corresponding to the determined type of the display unit.

* * * * *